(12) United States Patent
Lucatello et al.

(10) Patent No.: US 8,909,460 B2
(45) Date of Patent: Dec. 9, 2014

(54) INTERNAL COMBUSTION ENGINE WITH CYLINDERS THAT CAN BE DE-ACTIVATED, WITH EXHAUST GAS RECIRCULATION BY VARIABLE CONTROL OF THE INTAKE VALVES, AND METHOD FOR CONTROLLING AN INTERNAL COMBUSTION ENGINE

(75) Inventors: Marco Lucatello, Orbassano (IT); Fabio Borean, Orbassano (IT)

(73) Assignee: C.R.F. Società Consortile per Azioni, Orbassano (Torino) (IT)

( * ) Notice: Subject to any disclaimer, the term of this patent is extended or adjusted under 35 U.S.C. 154(b) by 888 days.

(21) Appl. No.: 13/101,631

(22) Filed: May 5, 2011

(65) Prior Publication Data

US 2011/0313643 A1 Dec. 22, 2011

(30) Foreign Application Priority Data

Jun. 18, 2010 (EP) ..................................... 10425210

(51) Int. Cl.
*F02B 47/08* (2006.01)
*F02M 25/07* (2006.01)
*F02D 13/02* (2006.01)
*F02D 17/02* (2006.01)

(52) U.S. Cl.
CPC ........ *F02D 13/0261* (2013.01); *F02D 13/0269* (2013.01); *F02D 17/02* (2013.01);
(Continued)

(58) Field of Classification Search
CPC ..... F02D 41/0087; F02D 17/02; F02D 13/06; F02D 2041/0012; F02D 2041/001; F02D 41/006; F02D 13/04; F02D 9/06; Y02T 10/18; Y02T 10/121; Y02T 10/47; F01L 13/0005; F01L 13/06; F01L 13/065; F01L 1/181; F01L 1/26; F01L 1/344; F01L 1/3442; F01L 1/34; F01L 13/0036; F02M 25/0752; F02M 25/0707; F02M 25/0709; F02B 47/08; F02B 29/0406; F02B 37/18

USPC ........... 123/481, 198 F, 198 DB, 90.1, 90.12, 123/90.15, 90.16, 90.17, 320, 321, 568.13, 123/568.14, 568.15, 568.21
See application file for complete search history.

(56) References Cited

U.S. PATENT DOCUMENTS 5,117,790 A * 6/1992 Clarke et al. .................. 123/321
5,934,263 A 8/1999 Russ et al.
(Continued)

FOREIGN PATENT DOCUMENTS

EP 0803642 A1 10/1997
EP 0931912 A2 7/1999
(Continued)

OTHER PUBLICATIONS

European Search Report, dated May 11, 2011, for corresponding European Application No. 104225210.101263, completed on May 2, 2011.

*Primary Examiner* — Hai Huynh
*Assistant Examiner* — Raza Najmuddin
(74) *Attorney, Agent, or Firm* — Heslin Rothenberg Farley & Mesiti P.C.; Victor A. Cardona, Esq.

(57) ABSTRACT

A multi-cylinder internal combustion engine is provided with a system for the variable actuation of the intake valves. At least one part of the engine cylinders is deactivated, cutting off fuel supply to said cylinders, under operating conditions that do not require the maximum power of the engine and in which one wants to reduce fuel consumption. The intake valves of the deactivated cylinders are kept at least partly open during at least one part of the discharge stages in the deactivated cylinders, hence, in the deactivated cylinders, part of the burnt gases generated during the operation prior to the deactivation flows into the respective intake conduits during the discharge stage of each cylinder. The intake valves are closed after the discharge stage. The intake valves of the deactivated cylinders are further kept closed during the compression and expansion stages in each deactivated cylinder.

8 Claims, 8 Drawing Sheets

(52) U.S. Cl.
CPC ........... *F02M 25/0752* (2013.01); *Y02T 10/121*
(2013.01); *Y02T 10/142* (2013.01)
USPC ........... 701/112; 701/108; 701/103; 123/321;
123/320; 123/481; 123/198 F; 123/198 DB;
123/568.13; 123/90.15

(56) References Cited

U.S. PATENT DOCUMENTS

| | | | |
|---|---|---|---|
| 6,718,945 B2 * | 4/2004 | Doria et al. | 123/432 |
| 6,988,471 B2 * | 1/2006 | Chang | 123/90.12 |
| 7,072,758 B2 * | 7/2006 | Kolmanovsky et al. | 701/103 |
| 7,359,791 B2 * | 4/2008 | Borean et al. | 701/103 |
| 7,395,813 B2 * | 7/2008 | Pagot | 123/481 |
| 7,801,664 B2 * | 9/2010 | Winstead | 701/103 |
| 8,074,629 B2 * | 12/2011 | Winstead | 123/568.14 |
| RE43,486 E * | 6/2012 | Doria et al. | 123/432 |
| 8,224,558 B2 * | 7/2012 | Katou et al. | 701/110 |
| 8,316,819 B2 * | 11/2012 | Yamakawa et al. | 123/299 |
| 8,447,499 B2 * | 5/2013 | Gentile et al. | 701/105 |
| 2003/0111047 A1 * | 6/2003 | Doria et al. | 123/432 |
| 2004/0074481 A1 | 4/2004 | Geiser | |
| 2006/0037578 A1 * | 2/2006 | Nakamura | 123/198 F |
| 2007/0208489 A1 * | 9/2007 | Borean et al. | 701/103 |
| 2007/0255487 A1 * | 11/2007 | Etou et al. | 701/105 |
| 2008/0210196 A1 * | 9/2008 | Ashizawa et al. | 123/305 |
| 2011/0172898 A1 * | 7/2011 | Eiraku et al. | 701/103 |
| 2011/0313643 A1 * | 12/2011 | Lucatello et al. | 701/112 |

FOREIGN PATENT DOCUMENTS

| | | |
|---|---|---|
| EP | 0931912 B1 | 3/2001 |
| EP | 1243762 A2 | 9/2002 |
| EP | 1245799 A2 | 10/2002 |
| EP | 1243762 A3 | 7/2003 |
| EP | 1243764 A3 | 7/2003 |
| EP | 1338764 A1 | 8/2003 |
| EP | 1344900 A2 | 9/2003 |
| EP | 0961870 B1 | 3/2004 |
| EP | 1243761 B1 | 5/2004 |
| EP | 1245799 B1 | 6/2004 |
| EP | 1243763 B1 | 8/2004 |
| EP | 0939205 B1 | 10/2004 |
| EP | 1321634 A3 | 1/2005 |
| EP | 1091097 B1 | 3/2005 |
| EP | 1635045 A1 | 3/2006 |
| EP | 1635046 A1 | 3/2006 |
| EP | 1344900 A3 | 5/2006 |
| EP | 1653057 A1 | 5/2006 |
| EP | 1674673 A1 | 6/2006 |
| EP | 1726790 A1 | 11/2006 |
| EP | 1790841 A1 | 5/2007 |
| EP | 1936132 A1 | 6/2008 |
| EP | 2017439 A1 | 1/2009 |
| EP | 2067968 A1 | 6/2009 |
| EP | 2108800 A1 | 10/2009 |
| EP | 2138680 A1 | 12/2009 |
| EP | 2184451 A1 | 5/2010 |
| EP | 2184452 A1 | 5/2010 |
| EP | 2282022 A1 | 2/2011 |
| FR | 2885177 A1 | 11/2006 |

* cited by examiner

INTERNAL COMBUSTION ENGINE WITH CYLINDERS THAT CAN BE DE-ACTIVATED, WITH EXHAUST GAS RECIRCULATION BY VARIABLE CONTROL OF THE INTAKE VALVES, AND METHOD FOR CONTROLLING AN INTERNAL COMBUSTION ENGINE

CROSS REFERENCE TO RELATED APPLICATIONS

This application claims priority from European patent application No. 10425210.1, filed on Jun. 18, 2010, the entire disclosure of which is incorporated herein by reference.

FIELD OF THE INVENTION

The present invention refers to multi-cylinder internal combustion engines, of the type comprising:
- at least one intake valve for each cylinder,
- means for actuating intake valves suitable to vary the time and/or the opening stroke of the intake valves of each cylinder depending on the operating conditions of the engine, and independently from the intake valves of the other cylinders,
- electronic control means for controlling said actuator means and for controlling the supply of fuel to the engine cylinders.

PRIOR ART

An example of an engine of the type indicated above is described and illustrated in EP-A-1 936 132. Such document refers to a system for variable actuation of the intake valves of an internal combustion engine which was developed by the applicant and was sold under the trademark UNIAIR and MULTIAIR and it was also a subject of various other patent documents of the same applicant (see EP-A-803 642, EP-A-0 961 870, EP-A-0 931 912, EP-A-0 939 205, EP-A-1 091 097, EP-A-1 245 799, EP-A-1 243 763, EP-A-1 243 762, EP-A-1 243 764, EP-A-1 243 761, EP-A-1 273 270, EP-A-1 321 634, EP-A-1 338 764, EP-A-1 344 900, EP-A-1 635 045, EP-A-1 635 046, EP-A-1 653 057, EP-A-1 674 673, EP-A-1 726 790, the aforementioned EP-A-1 936 132, EP-A-2 067 968, EP-A-2 184 452, EP-A-2 017 439, EP-A-2 108 800, EP-A-2 138 680, EP-A-2 184 451, and the patent application EP 09 425 252 of the 30.06.2009, still undisclosed as of filing date of the present application).

FIG. 1 and FIG. 2 of the attached drawings refer to an example of an internal combustion engine of the type specified above and developed by the same applicant. FIG. 1 in particular illustrates a sectional view of cylinder head of an internal combustion engine with four in-line cylinders I, II, III, IV, according to the diagram of FIG. 4.

The cylinder head, indicated in its entirety with reference number 1, comprises, for each cylinder, a cavity 2 formed on the lower surface 3 thereof defining the combustion chamber, into which the two intake conduits 4 (only one of which is visible in the figure) and two exhaust conduits (not visible in the figure) end up. The communication of the two intake conduits with the combustion chamber 2 is controlled by two intake valves 5 (only one of which is visible in the figure) each comprising a stem 6 mounted sliding in the body of the head 1. Each valve 6 is returned towards the closed position by a spring 7 interposed between an inner surface of the head 1 and an end flange of the valve. The communication between the two exhaust conduits with the combustion chamber is controlled by two conventional type of valves (not shown in the figure) to which springs for returning towards the closed position are also associated.

The opening of each intake valve 6 is controlled, in the manner to be described hereinafter, by a camshaft 8 rotatably mounted around an axis 9 within supports (not visible in the figure) of the head 1, and comprising a plurality of cams 10 for the actuation of the intake valves 5.

Each cam 10 cooperates with a tappet 11 which in the illustrated example is constituted by an arm mounted oscillating at an end 12 thereof on the structure of the cylinder head and having a central portion which in a freely rotatably manner supports a roller 13 cooperating with the cam 10. The opposite end 14 of the rocker arm 11 controls a pumping plunger 15 by means of a plate 16 connected to the plunger 15. The latter is returned by a spring 17 against the arm 11, so as to keep the arm 11 at cooperation contact with the cam 10. The pumping plunger 15 is mounted sliding in a cavity which is provided in a preassembled block 18 which is mounted on the head 1 and which incorporates all electrical and hydraulic devices part of the variable actuation system of the intake valves with which the engine is provided, according to the detailed description provided hereinafter.

The pumping plunger 15 is capable of transmitting a thrust to the stem 6 of each intake valve 5, so as to cause the opening of the latter against the action of the spring 9, by means of a fluid under pressure (preferably oil coming from the engine lubrication circuit) present in a pressure chamber C to which the pumping plunger 15 faces. Following the thrust of the pumping plunger 15, the oil under pressure transfers from the chamber C to the chamber of a hydraulic actuator 19 whose plunger 20 pushes the valve 5 towards the open position.

All the aforementioned parts are also visible in FIG. 2, which shows the schematic representation of the system illustrated in FIG. 1.

Referring to both FIGS. 1, 2, the pressurized fluid chamber C associated to the intake valves 5 of each cylinder may be placed in communication with an exhaust channel 21 through a solenoid valve 22 controlled by a programmable electronic control unit 23. The solenoid valve 22, which may be of any known type, suitable for the function illustrated herein, is controlled by the control unit 23 depending on the signals S indicating the operating parameters of the engine, such as the position of the accelerator and the number of engine revolutions.

When the solenoid valve 22 is open, the chamber C enters in communication, through a channel 24 and a circumferential chamber 25 (FIG. 2), with the exhaust channel 21, hence the pressurized fluid present in the chamber C flows into such channel and the decoupling of the cam 10 and the tappet 7 is obtained with respect to the intake valves 5, which thus rapidly return to the closed position thereof, under the action of the return springs 9, if they are in the open condition, corresponding to a stage in which the tappet 11 is at contact with the lobe of the cam 10.

The exhaust channel 21 communicates, according to a solution previously proposed by the applicant, with a tank 26, vented at the upper part to the atmosphere in 27. The tank 26 in turn communicates through a conduit 28 with a pressurized fluid accumulator 29 (schematically illustrated in FIG. 2).

The exhaust tank 26 lastly communicates with a conduit 30 connected to the lubrication circuit of the engine through a conduit 31 in which a check valve 32 which allows the flow of fluid only towards the tank 26 is interposed.

In the illustrated example, the exhaust valves of the engine are controlled conventionally through a respective camshaft and a mechanical transmission.

In the operation of the engine, should the solenoid valve 22 be kept closed, the chamber C remains filled with pressurized fluid and the movements of the cam 10 are transmitted to the intake valves 5 according to a lift profile corresponding to the profile of the cam 10. The control unit 23 is however programmed to discharge the chamber C under determined operating conditions of the engine with the aim of causing the closing of the intake valves even when the cam 10 would tend to keep them open. Such solution thus allows varying the opening time (both as the duration of the opening and as the time of beginning as well as the time of ending the opening) and/or the lifting of the intake valves at pleasure, for example to provide a deferred opening and/or an advance closing or for providing a plurality of openings and closings in the conventional stages of opening the intake valves, according to the description subject of the previous patents of the same applicant.

Still referring to FIG. 1, it should also be observed that the actuator 20 is also provided with hydraulic braking means which slow the final closing stroke of the intake valve 5 when the latter is closed following an opening of the solenoid valve 22, so as to avoid an excessive impact and an ensuing damage on the intake valve upon reaching the closed position. The hydraulic braking means are not described herein, in that they may be provided according to any of the previous methods known from the previous patents documents of the same applicant.

In the previously described patent application EP-A-1 936 132, the applicant proposed a system of the afore-indicated type for the variable actuation of the intake valves of an internal combustion engine, in which the cams for the actuation of the intake valves of the engine each have a profile comprising a main portion to cause the opening of the intake valve during the stage of intake into the respective engine cylinder and an additional portion to cause a partial opening of the intake valves even during the discharge stage in the respective cylinder.

FIG. 3 of the attached drawings shows a diagram representing the lift profiles of the intake valve and of the exhaust valve of a cylinder of an engine of this type.

In such figure, profile A regards a lift of the intake valve, and profile B regards the exhaust valve. The diagram shows the lift in mm depending on the engine angle. In the convention acquired by the diagram of FIG. 3, the 180° engine angle corresponds to the condition in which the plunger is at the bottom dead centre, at the beginning of the discharge stage in the cylinder. The 360° angle corresponds to the condition in which the plunger reaches the top dead centre, at the end of the discharge stage and at the beginning of the subsequent intake stage, which theoretically terminates at an engine angle equivalent to 540°, where the plunger is once again found at the bottom dead centre. As observable in FIG. 3, the profile A has a main portion A1 (having the traditional bell-like shape) which causes the opening of the valve during the normal stage of intake into the cylinder and an additional portion A2, which causes an additional lift of the intake valve during the discharge stage. The additional profile A2 is substantially extended starting from an angle equivalent to 180° (bottom dead centre), at the beginning of the discharge stage, with a first ascending section "a" connected with a second section "b" at a substantially constant lift, equivalent to a maximum lift fraction achieved by the intake valve during the intake stage. Sections A1 and A2 of profile A for lifting the intake valve are determined by a corresponding profile of the cam 10 (FIG. 2), which has a lobe including a main portion 10a corresponding to the portion A1 of the lift profile and an additional portion 10b corresponding to portion A2 of the lift portion.

It should be observed that the field of the invention is extended to any engine provided with a system for variable actuation of the intake valves, even though different from the UNIAIR and MULTIAIR systems of the applicant, as long as they are capable of allowing the adjustment of time and/or opening stroke of the intake valves of each cylinder independently from the intake valves of the other cylinders. Various types of devices aimed at allowing a variable actuation of the engine valves have already been proposed previously. Such devices include both electro-hydraulic devices and electro-magnetic devices, which allow eliminating the camshaft (so-called "camless" systems), in which each valve of the engine is directly actuated by a solenoid actuator, controlled electronically. Each of such systems is capable of allowing a variable actuation of the intake valves of each cylinder independently from the intake valves of the other cylinders. The present invention refers to any engine of this type.

Technical Problem on which the Invention is Based

Starting from the abovementioned prior art, the applicant set the objective of exploiting a system for variable actuation of the intake valves of the engine to obtain the maximum operation efficiency of the engine, with low fuel consumption and without negatively influencing the developed power.

Deactivating one or more cylinders by cutting off the fuel supply to such cylinders in order to reduce the consumption of a multi-cylinder engine under given operating conditions is already known. According to the known solutions, during the deactivating stage, the intake valves of the deactivated cylinders are kept closed. Should the variable actuation system of any type described above not be available, it may be obtained easily.

The deactivation of one or more engine cylinders when one wants to reduce fuel consumption however represents a new problem. This is apparent from an analysis of FIGS. 5, 6 of the attached drawings. FIG. 5 is a diagram showing the variation of pressure in a deactivated cylinder of the engine upon variation of the engine angle. Also in such figure, the 180° angle corresponds to the condition wherein the plunger is at the bottom dead centre at the beginning of the discharge stage. During the discharge stage, i.e. from the 180° engine angle up to the 360° engine angle, the exhaust valves associated to the deactivated cylinder open in a usual manner, while in the subsequent intake stage, which ranges between the 360° engine angle to the 540° engine angle, the intake valves are kept closed. By keeping the intake valves closed during the intake stage, the mass present in the cylinder is minimum: it is solely constituted by burnt gases, generated during the operation of the cylinder immediately before the activation, which remain in the combustion chamber at the end of the discharge stage. Once the cylinder is deactivated, during the intake, compression and expansion stages subsequent to the above-mentioned discharge stage the mass left in the cylinder is subsequently expanded, then compressed and then expanded once again. At the end of the expansion (900° engine angle in FIG. 5) the pressure in the cylinder is minimum, much lower than the atmospheric pressure. This causes, during the subsequent discharge stage, when the exhaust valves open, first a mass flow from the exhaust conduit towards the cylinder. Subsequently, such mass is once again discharged into the exhaust conduit, as it usually occurs during the conventional discharge stage. However, all this implies considerable loss of work due to a pumping effect, as observable in the diagram of FIG. 6, which shows the variation of pressure in the cylinder upon variation of the volume available in the cylinder, (i.e. the position of the plunger). The pumping operation (loss) proportionally increases as the compressed air in the closed-loop diagram increase.

OBJECT OF THE INVENTION

The object of the present invention is that of overcoming the previously indicated drawback, by providing an engine that is capable of operating with one or more cylinders deactivated and simultaneously capable of minimizing the pumping loss.

SUMMARY OF THE INVENTION

With the aim of attaining such purpose, the invention has the object of an internal combustion engine, comprising:
at least one intake valve for each cylinder,
means for actuating the intake valves suitable to vary the time and/or the opening stroke of the intake valves of each cylinder depending on the operating conditions of the engine, and independently from the intake valves of the other cylinders,
electronic control means for controlling said actuator means and for controlling the supply of fuel to the engine cylinders,
characterised in that:
said electronic control means are programmed for:
deactivating at least one part of the engine cylinders, cutting off fuel supply to said cylinders, under operating conditions that do not require the maximum power of the engine and in which one wants to reduce fuel consumption,
keeping the intake valves of the deactivated cylinders at least partly open during at least one part of the discharge stage in each deactivated cylinder, in the abovementioned operating conditions with cylinders deactivated, hence in the deactivated cylinders part of the burnt gases generated during the operation prior to the deactivation flows into the respective intake conduits (4) during the discharge stage of each cylinder,
keeping the intake valves of the deactivated cylinders closed after the discharge stage in each deactivated cylinder, as soon as—with the subsequent intake stage—the burnt gases left in the respective intake conduit return into the cylinder, and before any substantial amount of fresh air starts getting into the cylinder,
keeping said intake valves of the deactivated cylinders closed during the compression and expansion stages in each deactivated cylinder, over the duration of the deactivation condition.

The invention also has the object of a method for controlling multi-cylinder internal combustion engine,
in which the engine comprises:
at least one intake valve for each cylinder, and
means for actuating intake valves suitable to vary the time and/or the opening stroke of the intake valves of each cylinder depending on the operating conditions of the engine, and independently from the intake valves of the other cylinders,
said method being characterised in that:
at least one part of the engine cylinders is deactivated, cutting off fuel supply to said cylinders, under operating conditions that do not require the maximum power of the engine and in which one wants to reduce fuel consumption,
in the abovementioned operating conditions with cylinders deactivated, the intake valves of the deactivated cylinders are kept at least partly open during at least one part of the discharge stages in deactivated cylinders,
hence, in the deactivated cylinders, part of the burnt gases generated during the operation prior to the deactivation flows into the respective intake conduits during the discharge stage of each cylinder,
said intake valves being closed after the discharge stage in the respective deactivated cylinder, as soon as—with the subsequent intake stage—the burnt gases left in the respective intake conduit return into the cylinder, and before any substantial amount of fresh air starts getting into the cylinder,
said intake valves of the deactivated cylinders being further kept closed during the compression and expansion stages in each deactivated cylinder, over the duration of the deactivation condition.

In the engine and in the method according to the invention, part of the burnt gases left in each deactivated cylinder is conveyed to the respective intake conduit during the discharge stage and returns into the cylinder during the subsequent intake stage. During such intake stage, the valve or the intake valves associated to the deactivated cylinder however close before even fresh air gets into the cylinder, additionally to the abovementioned part of burnt gases.

Therefore, controlling the intake valves of the deactivated cylinders according to the disclosure of the present invention, allows introducing into each deactivated cylinder, during the intake stage, neither oxidizer nor fuel. The thus provided cycle allows minimising the pumping losses on the deactivated cylinder.

According to a preferred embodiment, the correct instant of closing of the intake valves of the deactivated cylinders during the stage of intake into each deactivated cylinder is empirically determined with an engine calibration operation, according to the output signal from a lambda probe associated to the engine exhaust conduit.

In the preferred embodiment of the invention, only one part of the cylinders (for example only two cylinders in a four-cylinders engine) is deactivated, while the remaining cylinders are left active. Thus, keeping some cylinders in active condition allows maximising the thermodynamic efficiency of the engine. At the same time the invention is suitable to reduce the pumping losses determined by the deactivated cylinders to the minimum, due to the previously described method for controlling the intake valves. The overall result is thus that of reducing consumption substantially maintaining the supplied power constant.

BRIEF DESCRIPTION OF THE FIGURES

Now, the invention shall be illustrated with reference to the attached drawings, purely provided by way of non-limiting example wherein.

The engine according to the invention is provided with a variable actuation system of the intake valves of the cylinders of any known type suitable to allow the variation of the opening and/or lift time of the intake valves of each engine cylinder independently from the intake valves of the other cylinders. The preferred embodiment illustrated herein refers to an engine provided with a UNIAIR or MULTIAIR system of the previously described type. However, as previously indicated, the invention is also immediately applicable to engines also provided with different systems, both of the electro-hydraulic type and of the "camless" type, wherein the valves of the engine are controlled by electronically controlled electromagnetic actuators.

Figure 1:
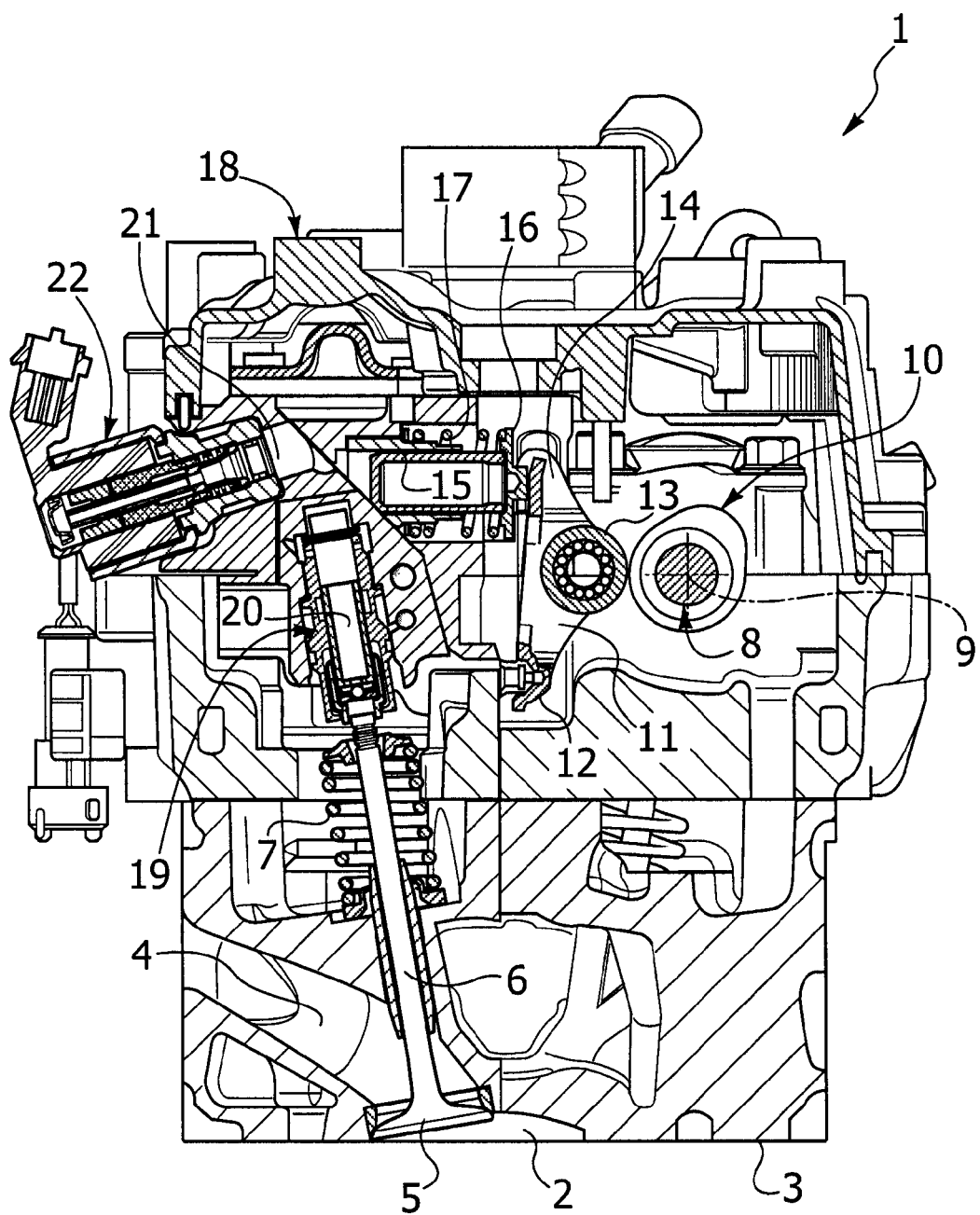
FIGS. 1, 2, described previously, are a sectional view and a corresponding schematic view of an internal combustion engine according to the prior art proposed by the same applicant, also on which a preferred embodiment of the present invention is implemented,
FIG. 3, described previously, is a diagram showing the lift profiles of the exhaust valves and of the intake valves of an engine of the type of FIG. 1, such lift profiles also being used in the engine according to the present invention.
Figure 2:
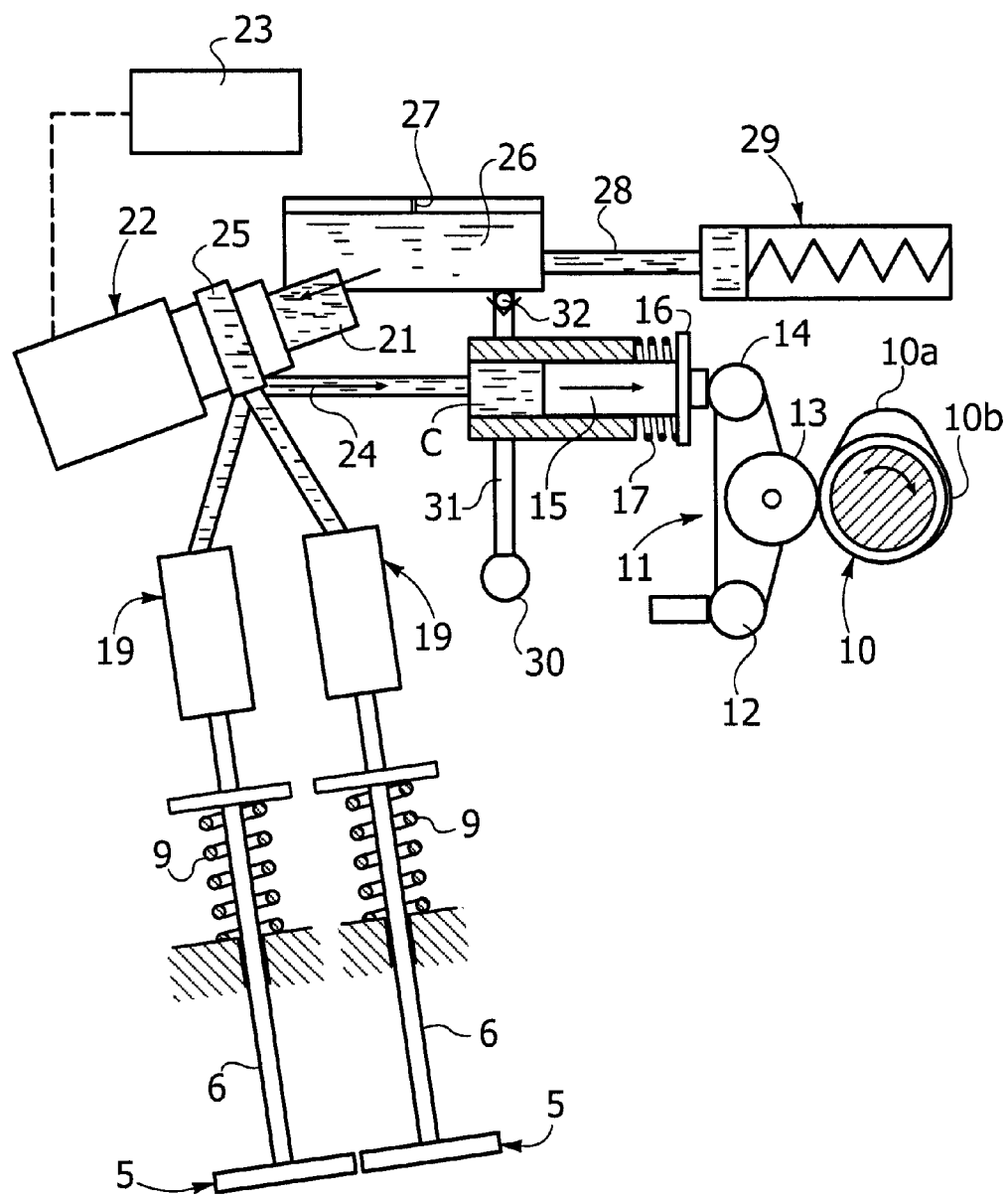
Figure 3:
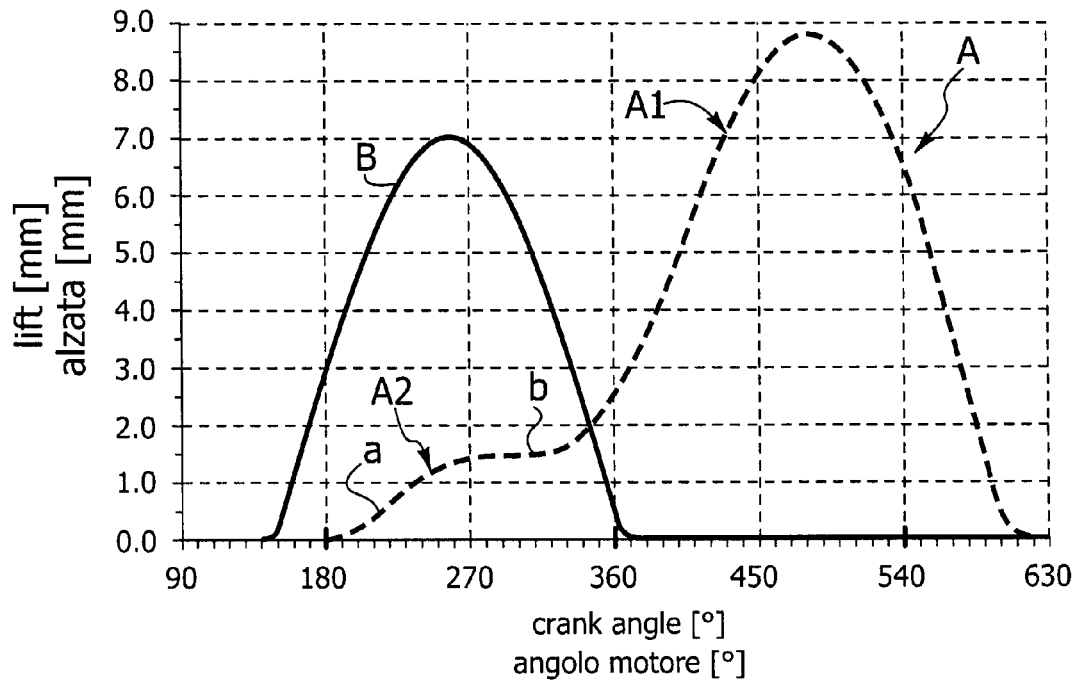
Figure 4:
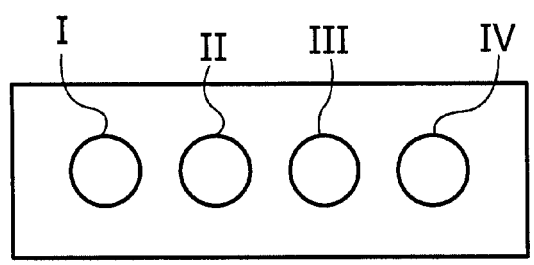
FIG. 4 is a schematic view of a four-cylinder engine to which the present invention is applicable, FIGS. 5, 6, also described previously, illustrate diagrams showing the drawbacks due to the pumping effect generated in the deactivated cylinders of an engine with cylinders that can be de-activated according to the prior art.

The example illustrated herein refers to an engine of the type of those of FIGS. 1, 2, with cams for actuating the intake valves with a profile corresponding to the lift profile A of FIG. 3. Obviously such profile is illustrated herein purely by way of example, the sole essential element being that it should include an additional portion A2 suitable to cause an at least partial opening of the intake valve during the discharge stage of the respective cylinder. Therefore, for example it is entirely possible that the engine angle at which the section A2 of the profile A starts be for example lower than the value of 180°, i.e. the opening of the intake valve occurs in advance with respect to what is observable in FIG. 3. Likewise, the profile of the portion A2 could also be different from the illustrated one, just like the lift value of the intake valve at the profile A2 could also correspond to a different percentage with respect to the maximum lift at the main portion A1 of the profile A.

According to the invention, as observed, it is provided for that in given operating stages of the engine, where maximum power is not required, one or more cylinders be deactivated by cutting off fuel supply to such cylinders. Such result is obtained by means of a corresponding programming of the control unit 23 (FIG. 2) which also provides for controlling the fuel injectors associated to the various engine cylinders. In the case of the petrol engine, the control unit 23 also provides for disabling the ignition in the cylinders to be deactivated.

In the preferred embodiment of the invention, only one part of the cylinders (for example only two cylinders in a four-cylinder engine) is deactivated, while the remaining cylinders remain active. Thus, keeping some cylinders in active condition allows maximising the thermodynamic efficiency of the engine. At the same time the invention is suitable to reduce the pumping losses determined by the deactivated cylinders to the minimum. The overall result is thus that of reducing consumption substantially maintaining the supplied power constant.

The criterion according to which the cylinders are deactivated is typically related to the engine load, i.e. the cylinders are deactivated only in case of loads below a given threshold (for example 2-3 bars PME) and at a given range of engine revolution speed. Such criterion is set by means of an engine calibration operation, if necessary also taking into account the vibration impact on the engine (more critical in particular at slow-run engine speed) and the perception of the driver. A signal system capable of signalling to the driver regarding the deactivation of one or more cylinders and/or capable of explicitly requesting the driver's consent (for example through the activation of a button) before enabling the method with some deactivated cylinders may be provided for.

Figure 9:
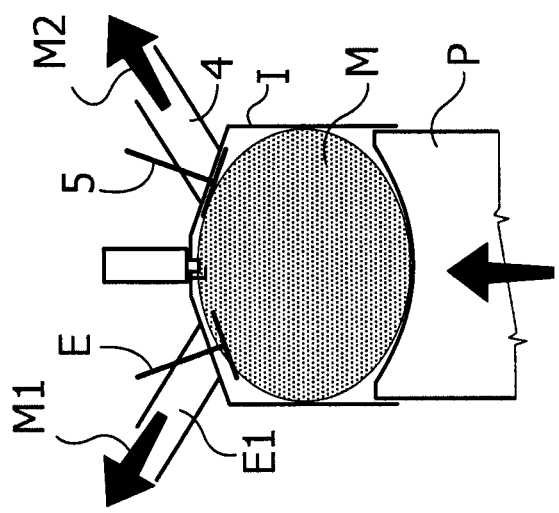
FIGS. 9-11 are schematic views of various operating stages of an engine cylinder according to the preferred embodiment of the invention, during the deactivated condition thereof.
Figure 10:
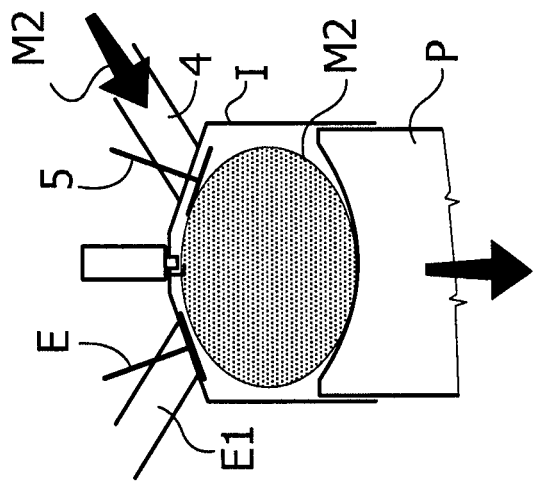
Figure 11:
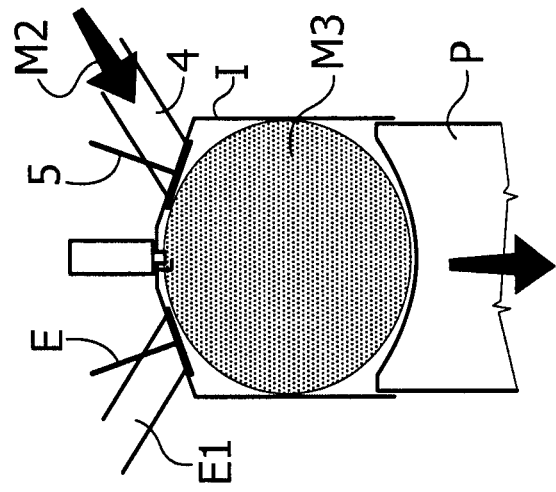

FIGS. 9-11 show the operating stages of the deactivated engine cylinder according to the invention.

FIG. 9 shows a deactivated cylinder should the deactivation occur immediately before the discharge stage in the cylinder, when the plunger is at the bottom dead centre. The entry of the cylinder into the deactivated condition immediately enables the activation in the control unit 23 of the actuation system of the intake valves according to the corresponding method. In such method, during the discharge stage, the solenoid valve for controlling the intake valves associated to the deactivated cylinder is kept closed, so as to make the additional portion 10b of the cam 10, which thus partly opens the intake valves 5 during the discharge stage in the cylinder, efficient. In such stage, just like in the prior art, the exhaust valves associated to the cylinder I—one of which is visible in the drawing of FIG. 9 and it is indicated with reference E—open. Therefore, in such stage, the movement towards the top dead centre of the plunger P causes part M1 of the mass M of the burnt gases left in the cylinder to flow into the exhaust pipe E1 and part M2 of the mass M to flow into the intake conduit 4. The mass M2 however remains in the respective intake conduit, without reaching the plenum of the intake manifold, hence it does not mix with the air supplied to the cylinders left active.

The mass M2 left in the intake conduit returns into the cylinder in the subsequent intake stage, illustrated in FIG. 10, in which the plunger moves again towards the bottom dead centre, and in which the exhaust valve E is closed and the intake valve 5 is opened until it reaches the maximum lift thereof.

According to the invention, in such stage, the variable actuation system of the intake valves is once again exploited, closing the intake valve in advance if necessary with respect to what would be observed from the theoretical profile A corresponding to the profile of the cam. This is done in that, according to the invention, the intake valve—during the intake stage illustrated in FIG. 10—is closed once again (FIG. 11) once the mass M2 of the burnt gases left in the intake conduit returns into the cylinder, but before any substantial amount of fresh air the correct closing instant of the intake valve may be determined in the calibration of the engine, according to the signal output by the lambda probe associated to the engine exhaust system, in that the entry of fresh air into the cylinder determines diversions from the detected lambda) starts getting into the cylinder.

Figure 5:
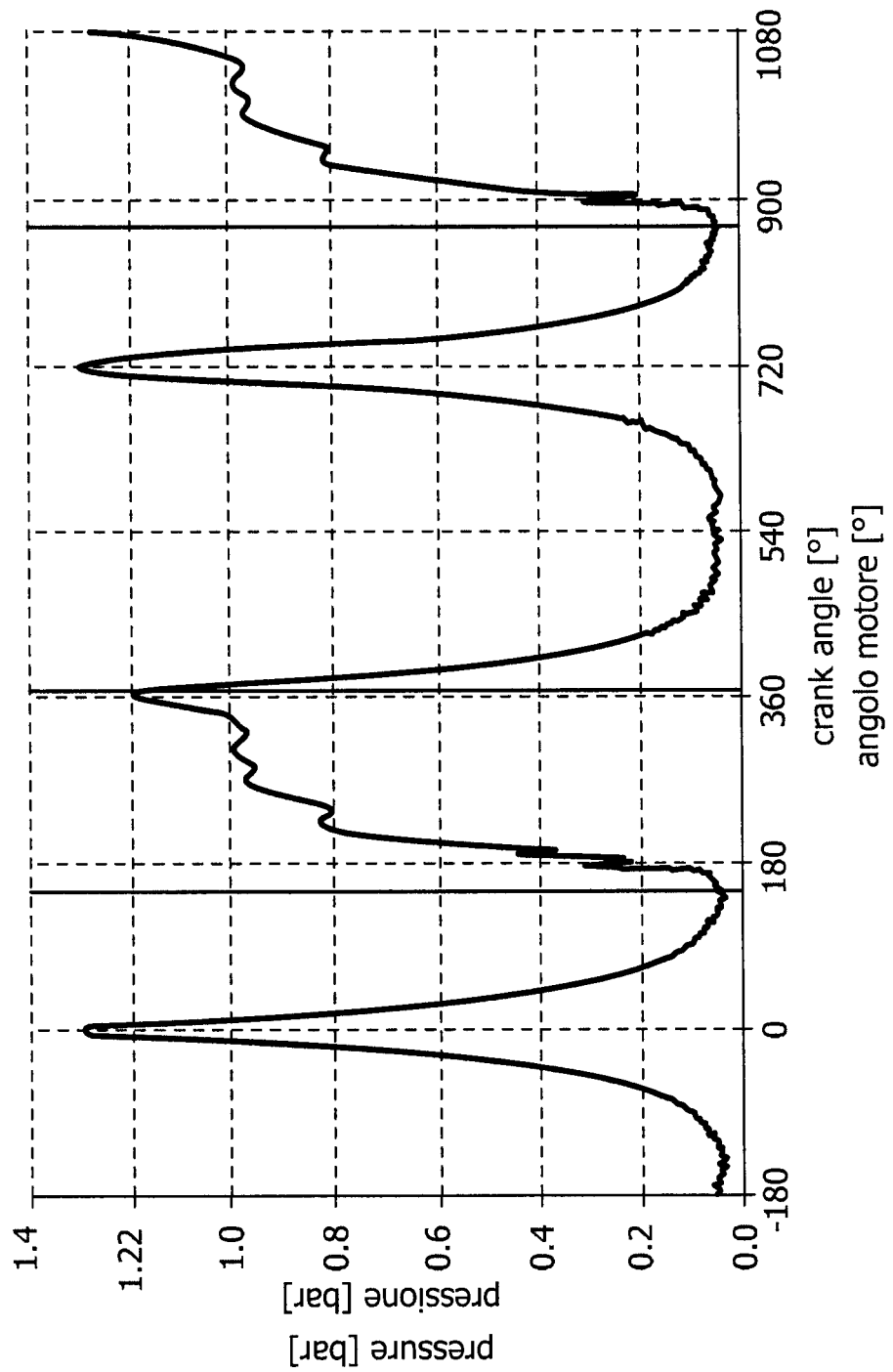
Figure 6:
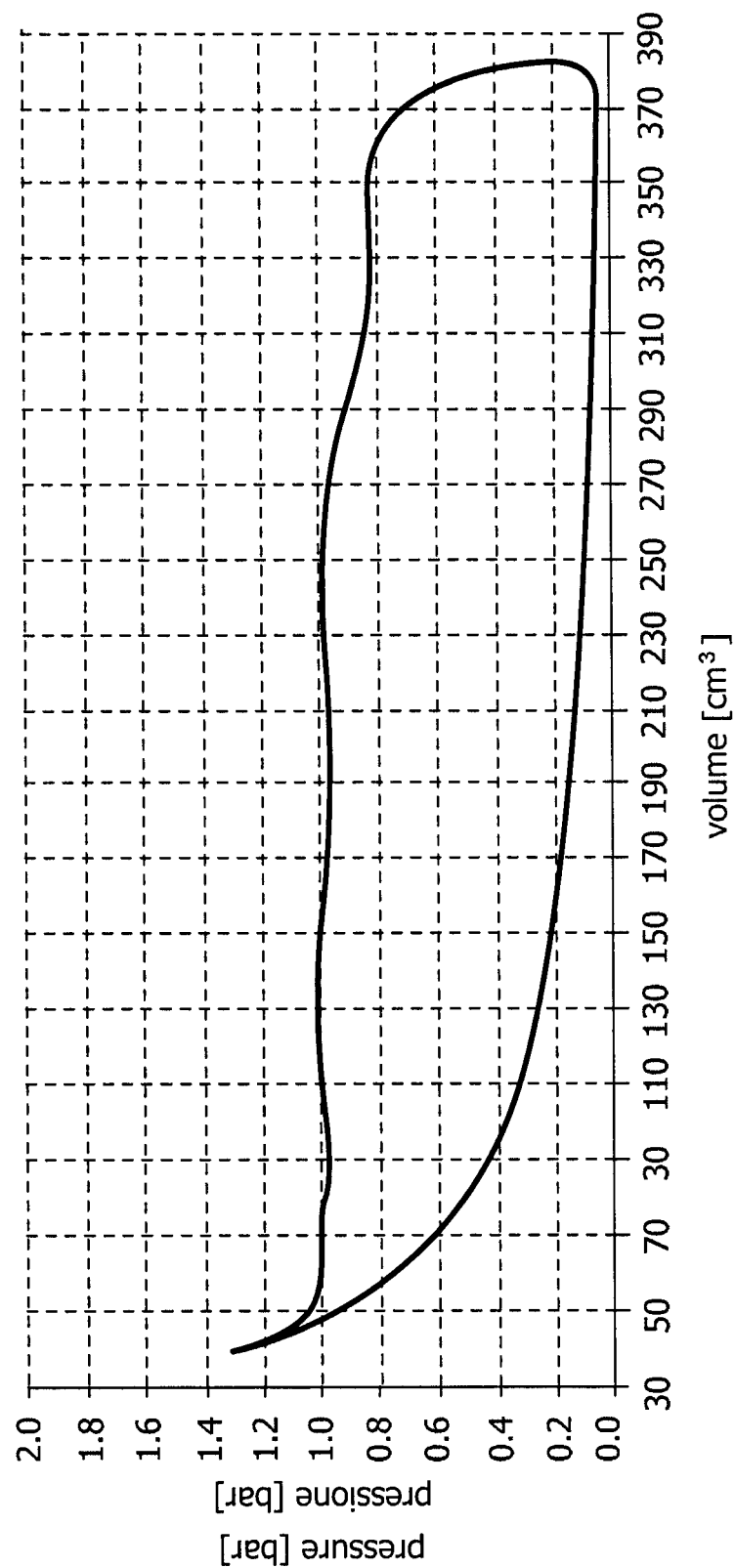
Figure 7:
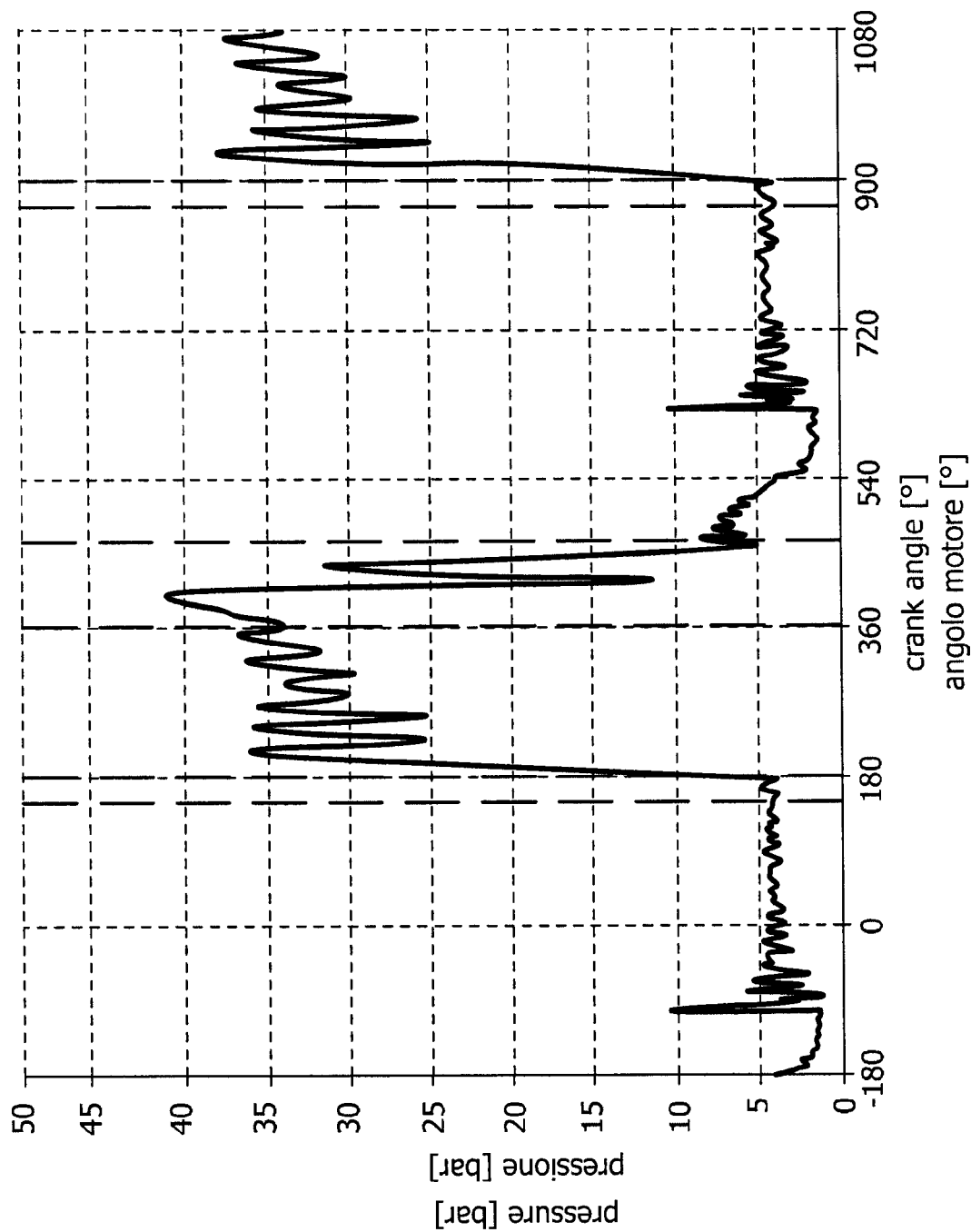
FIGS. 7, 8 are diagrams corresponding to those of FIGS. 5, 6 which refer to the engine according to the preferred embodiment of the present invention.
Figure 8:
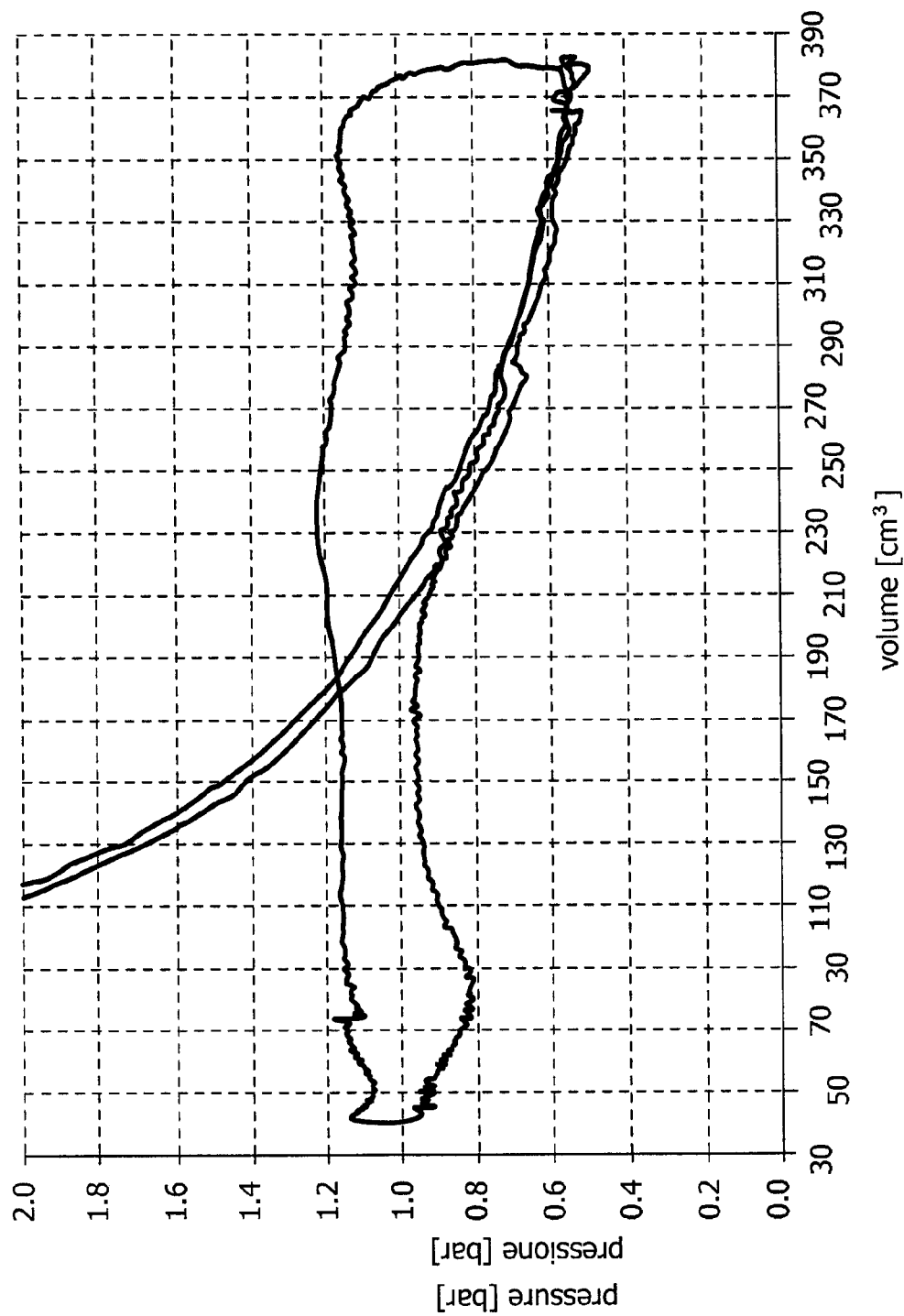

Therefore, by controlling the intake valve according to the disclosures of the present invention, allows introducing into each deactivated cylinder, during the intake stage, neither oxidizer nor fuel. The thus provided cycle allows minimising the pumping losses on the deactivated cylinder. Such result is shown by the diagrams of FIGS. 7, 8. The diagram of FIG. 7 corresponds to that of FIG. 5 and differs therefrom due to the fact that in the discharge stage the intake valves are opened. As observable from a comparison with FIG. 5, the pressure peaks at angles 0° and 720° (end of compression beginning of expansion are reduced). Consequently, the diagram which shows the pressure variation in the cylinder upon the variation of the available volume becomes the one illustrated in FIG. 8, the smaller area defined in the closed-loop diagram corresponding to a smaller amount of pumping work.

As apparent from the description above, the engine and the method according to the invention allow providing a highly efficient operation, in that part of the cylinders is deactivated, reducing fuel consumption, while the reaming part of the cylinders is kept active, to the advantage of thermodynamic efficiency. At the same time, the pumping losses due to the deactivated cylinders are reduced to the minimum, due to the fact that the variable actuation system of the intake valves is exploited, simultaneously with the provision of a suitable profile of the cams, to cause an additional opening of the intake valves during the discharge stage of the deactivated cylinders.

Obviously, without prejudice to the principle of the invention, the construction details and the embodiments may widely vary with respect to what has been described and illustrated purely by way of example, without departing from the scope of protection of the present invention.

In particular, the specific characteristics of the engine to which the invention is applied may also vary with respect to the example illustrated in FIG. 1. The number of engine cylinders may vary and the lift profiles of the intake valves may also vary with respect to what has been illustrated by way of example in FIG. 3.

Also as previously indicated, the invention may be generally implemented in any engine provided with a variable actuation system of the intake valves which allows the independent adjustment of the valves of a cylinder with respect to those of the other cylinders, even if different from the UNI-AIR and MULTIAIR systems of the applicant.

What is claimed is:

1. Multi-cylinder internal combustion engine, comprising:
   at least one intake valve for each cylinder of a plurality of cylinders of the engine,
   actuator means for the at least one intake valve suitable to vary the time and/or the opening stroke of the at least one intake valve of each cylinder depending on the operating conditions of the engine, and independently from the at least one intake valve of each other cylinder of the plurality of cylinders,
   electronic control means for controlling said actuator means and for controlling the supply of fuel to the plurality of cylinders of the engine,
   said electronic control means programmed for:
   deactivating at least one deactivated cylinder of the cylinders of the engine by cutting off fuel supply to said at least one deactivated cylinder of the plurality of cylinders, under operating conditions that do not require the maximum power of the engine and in which one wants to reduce fuel consumption,
   keeping the intake valves of the at least one deactivated cylinder at least partly open, in the abovementioned operating conditions with the at least one deactivated cylinder,
   the intake valves of the deactivated cylinders are kept open during at least one part of the discharge stage in each deactivated cylinder, so that in the at least one deactivated cylinder, part of the burnt gases generated during the operation prior to the deactivation flows into the respective intake conduits during the discharge stage of each cylinder of the at least one deactivated cylinder, without reaching a plenum of the engine intake manifold, so that said part of burnt gases does not mix with air supplied to the cylinders left active,
   keeping the intake valves of the at least one deactivated cylinder closed after the discharge stage in each deactivated cylinder of the at least one deactivated cylinder, as soon as—with the subsequent intake stage—the burnt gases left in the respective intake conduit return into the cylinder, and before any substantial amount of fresh air starts getting into the cylinder,
   keeping said intake valves of the at least one deactivated cylinder closed during the compression and expansion stages in each deactivated cylinder of the at least one deactivated cylinder, over the duration of the deactivation condition.

2. Engine according to claim 1, wherein said actuator means comprise at least one camshaft for controlling the intake valves by means of respective tappets, against the action of return spring means which push each intake valve towards a closed position,
   wherein at least one intake valve for each cylinder is controlled by the respective tappet with the intermediate of hydraulic means including a pressurized fluid chamber,
   wherein said pressurized fluid chamber is suitable to be connected by means of a passage controlled by a solenoid valve with an exhaust channel, so that when the solenoid valve is opened the intake valve is uncoupled from the respective tappet and it is kept closed by said spring means,
   said electronic control means being suitable to control each solenoid valve so as to vary the time and/or the opening stroke of the respective intake valve depending on the operating conditions of the engine,
   wherein the cam for controlling said intake valve has a profile with a main portion for causing the opening of the intake valve during the intake stage in the engine cylinder, and an auxiliary portion for causing an additional opening of the intake valve during the discharge stage,
   said electronic control means being programmed for:
   keeping the solenoid valves associated to the at least one deactivated cylinder closed during at least one part of the discharge stage of each deactivated cylinder of the at least one deactivated cylinder in the abovementioned operating conditions with cylinders deactivated, so that the abovementioned additional portion of the profile of the cams for controlling the intake valves of the at least one deactivated cylinder is rendered operative and keeps the intake valves at least partly open during at least one part of the discharge stages in the deactivated cylinders,
   opening said solenoid valves associated to the at least one deactivated cylinder, so as to cause the closing of the intake valves after the discharge stage in each deactivated cylinder, as soon as—with the subsequent intake stage—the burnt gases left in the intake conduit return into the cylinder, and before any substantial amount of fresh air starts getting into the cylinder,
   keeping said solenoid valves associated to the at least one deactivated cylinder open, so as to keep the intake valves closed during the compression and expansion stages in each deactivated cylinder of the at least one deactivated cylinder, over the duration of the deactivation condition.

3. Engine according to claim 2, wherein the cams for actuating the intake valves are configured in such a manner to provide a lift profile of each intake valve with an initial portion which is extended into a portion with substantially constant lift, said portions extending into the field corresponding to the discharge stage of the cylinder, said substantially constant lift portion subsequently extending into a portion having the conventional bell-like shape constituting the main portion of the lift profile of the intake valve.

4. Engine according to claim 1, wherein said electronic control means are programmed for deactivating only one part of the engine cylinders.

5. Method for controlling a multi-cylinder internal combustion engine, wherein the engine comprises:
- at least one intake valve for each cylinder, and
- actuator means for the intake valves suitable to vary the time and/or the opening stroke of the intake valves of each cylinder depending on the operating conditions of the engine, and independently from the intake valves of the other cylinders,
- at least one deactivated cylinder deactivated, cutting off fuel supply to said at least one deactivated cylinder, under operating conditions that do not require the maximum power of the engine and in which one wants to reduce fuel consumption,
- in the abovementioned operating conditions with cylinders deactivated, the intake valves of the at least one deactivated cylinder are kept at least partly open,
- the intake valves of the deactivated cylinders are kept open during at least one part of the discharge stage in each deactivated cylinder, so that, in the at least one deactivated cylinder, part of the burnt gases generated during the operation prior to the deactivation flows into the respective intake conduits during the discharge stage of each cylinder, without reaching a plenum of the engine intake manifold, so that said part of burnt gases does not mix with air supplied to the cylinders left active,
- said intake valves being closed after the discharge stage in the respective deactivated cylinder, as soon as—with the subsequent intake stage—the burnt gases left in the respective intake conduit return into the cylinder, and before any substantial amount of fresh air starts getting into the cylinder,
- said intake valves of the at least one deactivated cylinder being further kept closed during the compression and expansion stages in each deactivated cylinder, over the duration of the deactivation condition.

6. Method according to claim 5, wherein said engine comprises at least one camshaft for controlling the intake valves by means of respective tappets, against the action of return spring means which push each intake valve towards a closed position,
- wherein at least one intake valve for each cylinder is controlled by the respective tappet with the intermediate of hydraulic means including a pressurized fluid chamber,
- wherein said pressurized fluid chamber is suitable to be connected by means of a passage controlled by a solenoid valve with an exhaust channel, hence when the solenoid valve is open, the intake valve is decoupled from the respective tappet and it is kept closed by said spring means,
- electronic control means for controlling each solenoid valve being associated to said engine so as to vary the time and/or the opening stroke of the respective intake valve depending on the operating conditions of the engine, said electronic control means also being prearranged for controlling the supply of fuel to the cylinders of the engine,
- wherein the cam for controlling said intake valve has a profile with a main portion for causing the opening of the intake valve during the intake stage in the engine cylinder, and an auxiliary portion to cause an additional opening of the intake valve during the discharge stage,
- in the abovementioned operating conditions with cylinders deactivated, the solenoid valves associated to the deactivated cylinders kept closed during at least one part of the discharge stage of the respective cylinder, so that the abovementioned additional portion of the profile of the cams for controlling the intake valves of the deactivated cylinders is rendered operative and keeps the intake valves at least partly open during at least one part of the discharge stages in the deactivated cylinders,
- said solenoid valves associated to the at least one deactivated cylinder instead being controlled to close the intake valves after the discharge stage of the respective deactivated cylinder, as soon as—with the subsequent intake stage—the burnt gases left in the intake conduit return into the cylinder, and before any substantial amount of fresh air starts getting into the cylinder,
- said solenoid valves associated to the at least one deactivated cylinder also being controlled to keep the intake valves closed during the compression and expansion stages in each deactivated cylinder, over the duration of the deactivation condition.

7. Method according to claim 5, wherein only one part of the engine cylinders is deactivated.

8. Method according to claim 5, wherein the correct instant of closing of the intake valves of the at least one deactivated cylinder during the intake stage in each deactivated cylinder is empirically determined in an engine calibration operation, according to the output signal from a lambda probe associate to the engine exhaust conduit.

* * * * *